(12) United States Patent
Duggal et al.

(10) Patent No.: US 11,322,128 B2
(45) Date of Patent: May 3, 2022

(54) VIRTUAL AMBIENT ZONE CREATION IN CO-WORKING SPACES

(71) Applicant: INTERNATIONAL BUSINESS MACHINES CORPORATION, Armonk, NY (US)

(72) Inventors: Anita Duggal, Delhi (IN); Mukundan Sundararajan, West of Chord Road II Stage (IN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 17/027,786

(22) Filed: Sep. 22, 2020

(65) Prior Publication Data
US 2022/0093074 A1 Mar. 24, 2022

(51) Int. Cl.
*G10K 11/16* (2006.01)
*G10K 11/178* (2006.01)
(Continued)

(52) U.S. Cl.
CPC ........... *G10K 11/178* (2013.01); *G06N 20/00* (2019.01); *G10L 15/063* (2013.01); *G10L 25/51* (2013.01);
(Continued)

(58) Field of Classification Search
CPC ............ G10K 11/178; G10K 2210/111; G10K 2210/12; G06N 20/00; G10L 15/063; G10L 25/51
(Continued)

(56) References Cited

U.S. PATENT DOCUMENTS

2013/0182865 A1  7/2013 Paul
2017/0053640 A1*  2/2017 Kwan .............. G10K 11/17885

FOREIGN PATENT DOCUMENTS

CN  106847254 A  6/2017

OTHER PUBLICATIONS

Disclosed Anonymously, "Creating Quiet Zones in an Open Office Using a System of Microphones and Micro-Speakers, and a Voice Processor," IP.com, IPCOM000253825D; Pub. Date May 8, 2018, 6 pages.
(Continued)

*Primary Examiner* — Ammar T Hamid
(74) *Attorney, Agent, or Firm* — Robert R. Aragona

(57) ABSTRACT

An embodiment for creating a virtual ambient workstation is provided. The embodiment may include receiving a request to reserve an ambient space for a determined time period. The embodiment may also include identifying one or more workstations that are occupied by one or more other individuals. The embodiment may further include identifying combined vocal-fold sound patterns provided to a cognitive system based on the identified one or more workstations occupied by the one or more other individuals. The embodiment may also include evaluating data obtained from the one or more workstations and the combined vocal-fold sound patterns. The embodiment may further include generating an ambient noise remediation sound using an acoustic beam system. The embodiment may also include training the cognitive system. The embodiment may further include determining whether a level of ambient sound is sufficient and providing feedback to the cognitive system through machine learning.

20 Claims, 7 Drawing Sheets

(51) Int. Cl.
*G06N 20/00* (2019.01)
*G10L 15/06* (2013.01)
*G10L 25/51* (2013.01)
*A61F 11/06* (2006.01)

(52) U.S. Cl.
CPC .... *G10K 2210/111* (2013.01); *G10K 2210/12* (2013.01)

(58) Field of Classification Search
USPC .............................................. 381/71.8, 71.14
See application file for complete search history.

(56) References Cited

OTHER PUBLICATIONS

Mell et al., "The NIST Definition of Cloud Computing", National Institute of Standards and Technology, Special Publication 800-145, Sep. 2011, 7 pages.

* cited by examiner

US 11,322,128 B2

VIRTUAL AMBIENT ZONE CREATION IN CO-WORKING SPACES

BACKGROUND

The present invention relates generally to the field of computing, and more particularly to a cognitive system for creating a virtual ambient workstation.

Cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. Many companies today are focused on reducing costs while at the same time promoting employee collaboration. Employees must be mobile and flexible. Hence, modern workspaces are currently trending toward co-working spaces where employees work in a workstation.

SUMMARY

According to one embodiment, a method, computer system, and computer program product for creating a virtual ambient workstation is provided. The embodiment may include receiving a request to reserve an ambient space for a determined time period. The embodiment may also include identifying one or more workstations that are occupied by one or more other individuals. The embodiment may further include identifying combined vocal-fold sound patterns provided to a cognitive system. The identified combined vocal-fold sound patterns may be based on the identified one or more workstations occupied by the one or more other individuals. The embodiment may also include evaluating data obtained from the one or more workstations and the combined vocal-fold sound patterns. The evaluated data may enable shaping of beam patterns. The embodiment may further include generating an ambient noise remediation sound using an acoustic beam system. The ambient noise remediation sound may be configured to remove high intensity and frequency sounds from the one or more workstations. The embodiment may also include training the cognitive system. The training of the cognitive system may be performed when a new user registers for the workspace and vocal-fold frequency class information of the user may be adopted into the cognitive system. The training and validation may also be performed through the playing of speech and conversations at different volumes in different workstations. The embodiment may further include determining whether a level of ambient sound is sufficient. The embodiment may also include providing feedback to the cognitive system through machine learning. The provided feedback may adjust beam patterns created by the acoustic beam system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
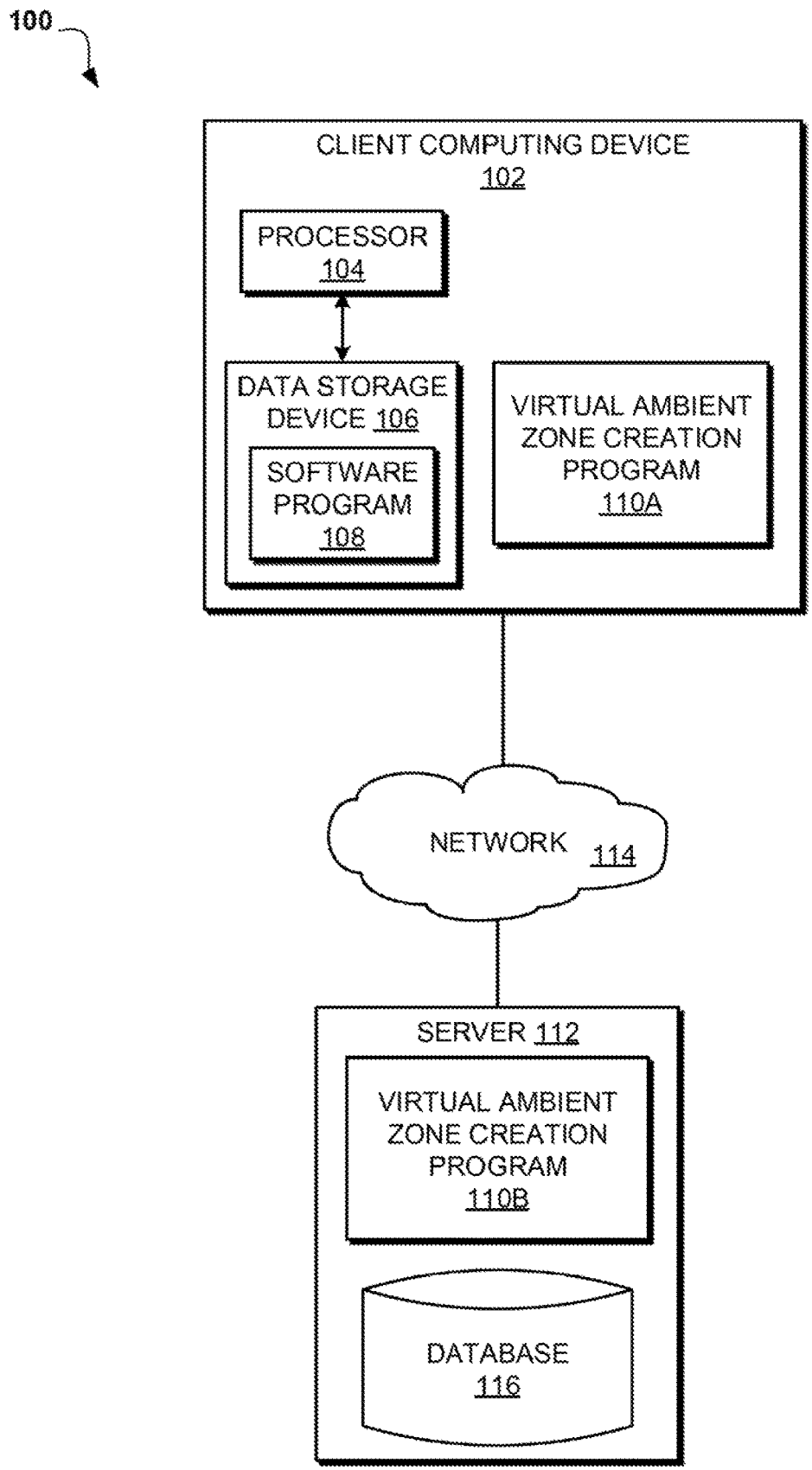
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a cognitive system for creating a virtual ambient workstation. It may be appreciated that "workstation" as used herein means a section of a workspace where employees share an area that may be separated by a partition. Hence, a workspace may comprise several workstations. The following described exemplary embodiments provide a system, method, and program product to, among other things, request an ambient working environment option by dynamically filtering outside noise and, accordingly, maximize a user's attention and productivity. It may be appreciated that "individuals," "users," and "employees" are used interchangeably herein. Therefore, the present embodiment has the capacity to improve the technical field of cognitive creation of a virtual ambient workstation by increasing workplace performance and reducing stress levels of employees.

As previously described, cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. Many companies today are focused on reducing costs while at the same time promoting employee collaboration. Employees must be mobile and flexible. Hence, modern workspaces are currently trending toward co-working spaces where employees work in a workstation. This arrangement allows companies to save on infrastructure spending while retaining the ability to work from a variety of locations in many cities and countries. Each individual works best under different conditions based on the individual's personality. One individual may enjoy a lively workstation, while another individual may require a quiet workstation. It may therefore be imperative to have a system in place to enable each individual in an organization to choose an ambient working environment option by dynamically filtering outside noise in order to maximize the individual's attention and productivity.

The modern trend of working in shared spaces has several advantages as described above, but there are also several disadvantages to the workstation approach. Perhaps the biggest challenge that co-working space users face is distractions caused by noises around them. Noises may be created through multiple sources such as movement of chairs, a co-worker talking on the phone, and meetings or socialization in the work area instead of in a conference room or break room. These issues may distract the user and lead to productivity reduction. This problem is typically addressed by a wind curtain, physical wall, i.e., glass or plastic, or noise cancellation devices. Wind curtains and noise cancellation devices may be dynamically configured to reduce incoming noises for one user, but they make it noisy for other users. Hence, it is not a feasible solution to use wind curtains and noise cancellation devices across multiple workstations. Moveable physical walls use up valuable space and physical separation of users prevents interactions with other employees. As such, it may be beneficial to proactively take measures to handle these issues by removing distracting noises from the one or more workstations. Thus, embodiments of the present invention may provide advantages including, but not limited to, removing noises from one workstation without creating noises for another workstation, increasing productivity of employees without decreasing levels of co-worker interaction, and providing a low cost solution to co-working centers.

According to at least one embodiment, when pre-recorded speech and conversations are played in different workstations, the cognitive system may be trained and tested before first use. When one or more users register and have a short conversation with a human or voice bot associated with a facility management system, the cognitive system may determine the vocal-fold frequency classes to which the one or more users' vowel frequencies map. The cognitive system may add the determined vocal-fold frequency classes to its training data set. The cognitive system may assess the impact to the existing combined vocal-fold sound patterns and may learn the changed patterns of sound to be generated for combinations of users in different workstations.

The registered one or more users may occupy different workstations which the facility management system may keep track of in real time. Through the facility management system, the one or more users may request the virtual ambient workstation for a determined time period and choose a level of ambient sound that may permeate the one or more workstations. The facility management system may identify the one or more workstations that are occupied by the one or more individuals, and patterns of sound and sound levels may be measured by Internet of Things (IoT) sensors. The sound patterns measured by the IoT sensors may be provided to the cognitive system and evaluated by the cognitive system to develop an artificial intelligence (AI) solution. The cognitive system may send the received data to the acoustic beam system which generates an ambient noise remediation sound to remove high intensity and frequency sounds from the one or more workstations. In at least one other embodiment, the one or more users may opt for a continuous ambient noise remediation sound. In at least one other embodiment, the one or more users may manually switch on or switch off the ambient noise remediation sound to interact with other users in the workspace. If the cognitive system determines the level of ambient sound is sufficient, the ambient noise remediation sound may continue to be generated without interruption until no acoustic activity is detected in the surroundings, or until the one or more users manually switch off the ambient noise remediation sound. If the level of ambient sound is not determined to be sufficient, feedback may be sent to a machine learning (ML) module within the cognitive system for learning and adjustments to beam patterns.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine, in real time, the sounds entering the one or more workstations of the one or more users and generate an ambient noise remediation sound to remove distracting noises from the one or more workstations.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a virtual ambient zone creation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a virtual ambient zone creation program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the virtual ambient zone creation program 110A, 110B may be a program capable of monitoring the vocal-fold frequency classes of the sounds generated during the real-time conversations of the one or more users, monitoring the sound levels and patterns of sound classes that enter the one or more workstations, and permeating the one or more workstations with ambient sounds to prevent the one or more users from becoming distracted. The virtual ambient zone creation method is explained in further detail below with respect to FIGS. 2 and 3.

Figure 2:
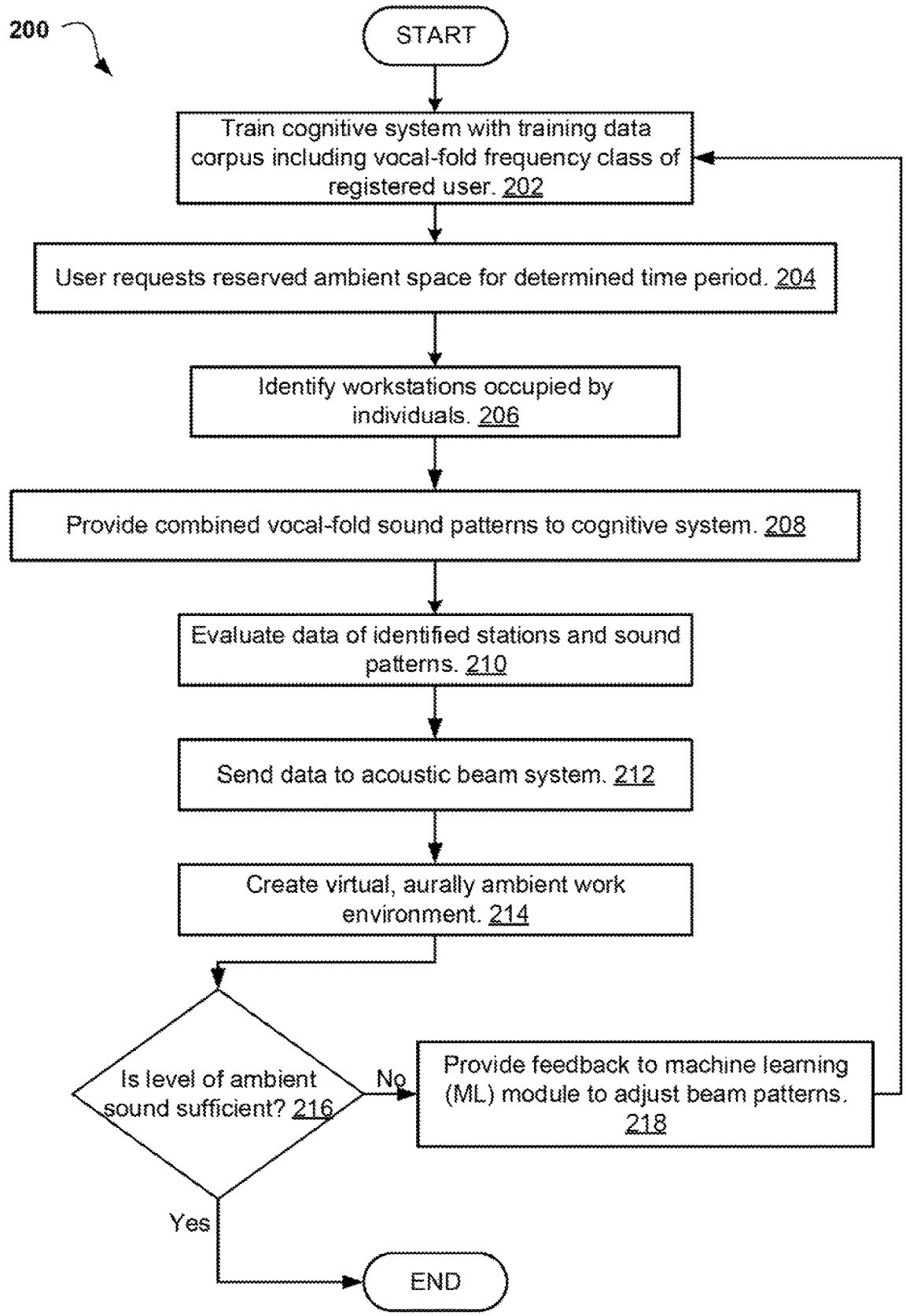
FIG. 2 illustrates an operational flowchart for managing a virtual ambient workstation in a virtual ambient workstation creation process according to at least one embodiment.

Referring now to FIG. 2, an operational flowchart for managing a virtual ambient workspace in a virtual ambient workspace creation process 200 is depicted according to at least one embodiment. At 202, the virtual ambient zone creation program 110A, 110B trains the cognitive system with a training data corpus including the vocal-fold frequency class information of the one or more users. The cognitive system may be trained with the vocal-fold frequency classes of the one ore more users as well as sound energy levels emanating from the one or more workstations, measured in decibels, upon initial setup of the virtual ambient zone creation program 110A, 110B. The training may be performed when one or more new users register with the facility management system and may be verified by playing pre-recorded speech and conversations at different volumes in different workstations. The training may also be performed by monitoring real-time conversations of the one or more users. Vowel frequency classes of the one or more users may be recorded by a facility management system such as TRIRIGA® (TRIRIGA and all TRIRIGA-based trademarks and logos are trademarks or registered trademarks of IBM, Inc. and/or its affiliates). For example, a telephone conversation may be played and the vowel frequency class of the one or more users on that telephone call may be recorded. In cases where feedback may be sent to the cognitive system in step 218, the cognitive system may also be iteratively trained through machine learning. It may be appreciated that the facility management system only records the vocal-fold frequency classes of the one or more users and sound levels emanating from the one or more workstations and not what the one or more users are actually saying. Details of the training process are explained in further detail below with respect to FIG. 3.

Then, at 204, the virtual ambient zone creation program 110A, 110B receives a user request to reserve the ambient space for the determined time period. The request may be made through the facility management system via the communication network 114. The facility management system may have an option for the one or more users to request an ambient zone feature. The one or more users may also request the level of ambient sound required through the facility management system. The level of ambient sound may be low, medium, or high. For example, the low sound range may be from 10 to 30 decibels, the medium sound range may be from 31 to 50 decibels, and the high sound range may be from 51 to 70 decibels. The level of ambient sound may also be manually inputted by the one or more users by writing in a specific decibel value. For example, the one or more users may select the ambient space for 2 hours at low sound level or for 2 hours at 10 decibels.

Next, at 206, the virtual ambient zone creation program 110A, 110B identifies the one or more workstations that are occupied by the one or more individuals. When the one or more users request the reserved ambient space for the determined time period in step 204, the facility management system may identify the one or more individuals occupying the surrounding (i.e., adjacent) one or more workstations and measure the patterns of sound and sound levels in the vocal-fold frequency classes coming from the one or more individuals during the occupation time for each of the one or more individuals. It may be appreciated that while measurements of sounds are taken during the registration time for each of the one or more individuals, the sounds generated during the occupation time itself for each of the one or more individuals may not be measured. The patterns of sound and sound levels may be measured by Internet of Things (IoT) sensors placed in the one or more workstations which measure and report to the cognitive system, for the occupation time, vocal-fold core frequencies, strength, and directions, as well as other noises such as noise from moving furniture and noise coming from devices of the one or more individuals. For example, smart sound sensors and infrared sensors may be placed in each of the one or more workstations to identify the occupied one or more workstations and the sounds emanating from each of the one or more workstations. If there are multiple individuals in a single workstation, the measurements of each of the individuals may also be recorded by the IoT sensors.

In at least one other embodiment, the workstations may be allocated across the floor of the entire workspace. Allocating the workstations across the floor may provide for a more accurate measurement of the sounds coming into a workstation as opposed to only allocating the adjacent one or more workstations.

In the present embodiment, at 208, the virtual ambient zone creation program 110A, 110B provides the combined vocal-fold sound patterns measured by the IoT sensors to the cognitive system. It may be appreciated that "combined vocal-fold sound patterns" as used herein means the combined sounds of vocal-fold core frequencies, conversation sounds, and other noises such as noise from moving furniture and noise coming from the devices of the one or more individuals in classes of frequencies such as 75-100 Hz, 101-130 Hz, etc. The cognitive system may utilize an application programming interface (API) in order to obtain the combined vocal-fold sound patterns from the IoT sensors. The API may be a software intermediary that sends a request to a provider and delivers a response. For example, the cognitive system may send a request to the IoT sensors for the measured sound patterns, and the IoT sensors may then provide the measured sound patterns to the cognitive system.

Next, at 210, the virtual ambient zone creation program 110A, 100B evaluates the data obtained from the identified one or more workstations and the combined vocal-fold sound patterns. The provided combined vocal-fold sound patterns may allow for a cognitive solution to determine the sounds that have to be molded to create the virtual ambient zone. The sounds that have to be molded may emanate from several different directions. For example, the employee in the workstation behind the one or more users may be talking on the telephone, and the employee in the workstation in front of the one or more users may be using a cellphone to stream video. To determine the frequencies from different directions that are expected to reach the one or more workstations, an AI solution $Z=A*X+B$ may be developed where Z is the matrix of the patterns of active frequency classes with amplitudes in dB/class that are beamed in sequence by each row of sensors of the acoustic beam system at the edge of the one or more workstations that have activated the ambient zone creation, A is the learned functionality of the frequency class patterns of the registered one or more users of the co-working space, X is the input amplitude in dB based on vocal-fold frequency classes of the one or more users who occupy the one or more workstations on one side of the ambient zone enabled one or more workstations, and B is the adjustment factor for total number of identified workstations and individuals occupying the identified workstations on the side of the ambient zone enabled one or more workstations. For example, the size of the matrix may be a 3×3 matrix, a 4×4 matrix, or any other size one of ordinary skill in the art may recognize to be sufficient to determine the frequencies expected to reach the one or more workstations. A frequency class may be a frequency range where an average individual speaks. For example, the frequency class for a man may be 85 Hz to 155 Hz, whereas the frequency class for a woman may be 165 Hz to 255 Hz.

Then, at 212, the virtual ambient zone creation program 110A, 110B sends the obtained data to the acoustic beam system. The acoustic beam system may utilize the API as described above to request from the cognitive system the frequencies and directions of the sounds that reach the one or more workstations. The acoustic beam system may be a combined sensor and generator pair laid out along the periphery of the one or more workstations. For example, the acoustic beamers may be placed in a wall, on a roof, on a floor, or on partitions as appropriate. The obtained data on frequencies and directions of sounds may allow for a cognitive solution to determine the beam patterns to be generated to remove unwanted sounds from the one or more workstations.

Next, at 214, the virtual ambient zone creation program 110A, 110B generates the ambient noise remediation sound. The ambient noise remediation sound may be configured to remove the high intensity and frequency sounds from the one or more workstations. For example, words, chair screeches, and other noises may be removed from the one or more workstations to foster an acoustic neutral environment by absorbing a cacophony of sounds entering the one or more workstations with a pattern of beamed sound waves. Walls of the one or more workstations may have acoustically treated material, such as cloth or foam, that can be moved to create additional acoustic absorption layers. By generating the ambient noise remediation sound through the absorption of incoming sounds with the pattern of beamed sound waves, the one or more workstations may be made ambient for the duration that patterns of sound and sound levels are measured. The virtual ambient zone creation program 110A, 110B may keep a time record for all instances the ambient noise remediation sound is being generated. When there is no acoustic activity detected in the surroundings, the ambient noise remediation sound may be switched off automatically by the virtual ambient zone creation program 110A, 110B.

In at least one other embodiment, the one or more users may opt for a continuous ambient noise remediation sound through the facility management system via the communication network 114. For example, the one or more users may enjoy the white noise effect coming from the ambient noise remediation sound and may choose to keep this sound for the duration of the workday.

In at least one other embodiment, the one or more users may opt to manually switch on or switch off the ambient noise remediation sound through the facility management system via the communication network 114. For example, the one or more users may want to interact with another individual outside the one or more workstations and therefore switch off the ambient noise remediation sound. When the interaction is over, the one or more users may want to reestablish the generation of the ambient noise remediation sound. In another instance, the one or more users may want to interact with the one or more individuals in the one or more adjoining workstations and, through the facility management system, extend the set-up to include the one or more adjoining workstations when the acoustic beam system between the two or more adjoining workstations so selected are turned off, thereby creating a larger ambient zone. The one or more users may thus co-opt or remove virtual partitions in the one or more adjoining workstations for varying time durations as necessary and revert back to prior configurations.

Figure 7:
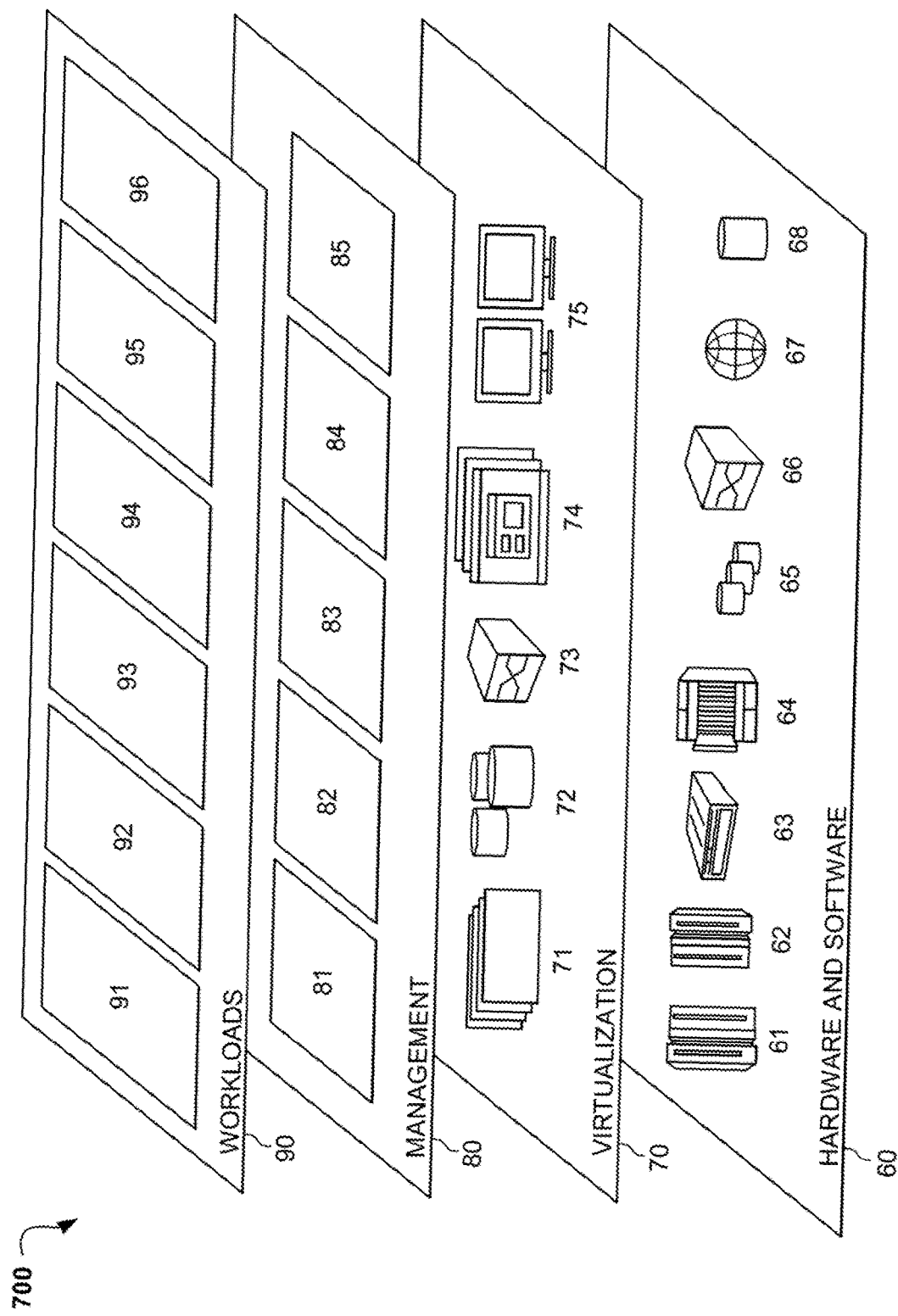
FIG. 7 depicts abstraction model layers according to an embodiment of the present invention.

Then, at 216, the virtual ambient zone creation program 110A, 110B determines whether the level of ambient sound is sufficient. The determination may be made based on the level of ambient sound requested by the one or more users in step 204. The IoT sensors may be used to detect whether the unwanted sounds are still passing into the one or more workstations. If the virtual ambient zone creation program 110A, 110B determines that the level of ambient sound is not sufficient, the virtual ambient workspace creation process 200 proceeds to step 218 to provide feedback to the cognitive system for learning and adjustment of the beam patterns via a phase shift. If one of two sound waves of the same frequency is shifted by one-half cycle relative to the other, the sound waves are said to be "out of phase." Two waves that are out of phase exactly cancel each other when added together. The cancellation of sound waves may be equally well achieved when the two waves in the same or different frequencies are orthogonal and the resulting wave has a smaller amplitude in the resultant direction angled into the virtual ambient zone. Thus, when colliding with additional wavefronts, the incoming vowel frequency sound may be reduced significantly or nullified as shown in FIG. 7, explained in further detail below. The cancellation of the waves may allow for the required level of ambient sound. If the virtual ambient zone creation program 110A, 110B determines that the level of ambient sound is sufficient, the virtual ambient workspace creation process 200 ends.

Next, at 218, the virtual ambient zone creation program 110A, 110B provides feedback to the cognitive system. The IoT sensors inside the workstation may measure the level of the unwanted sounds that are still coming into the one or more workstations. For example, if the one or more users choose a decibel level of 10 in step 204, and the IoT sensors measure a decibel level of 14, feedback may be sent to the ML module within the cognitive system. The ML module may be a module that enables computer programs, such as the virtual ambient zone creation program 110A, 110B, to automatically learn and improve from experience without being explicitly programmed. Therefore, the provided feedback may allow for a cognitive solution to learn from the beam patterns that fail to produce the sufficient level of ambient sound and adjust the beam patterns accordingly. Upon the adjustment of the beam patterns, the virtual ambient workspace creation process 200 proceeds back to step 202.

Figure 3:
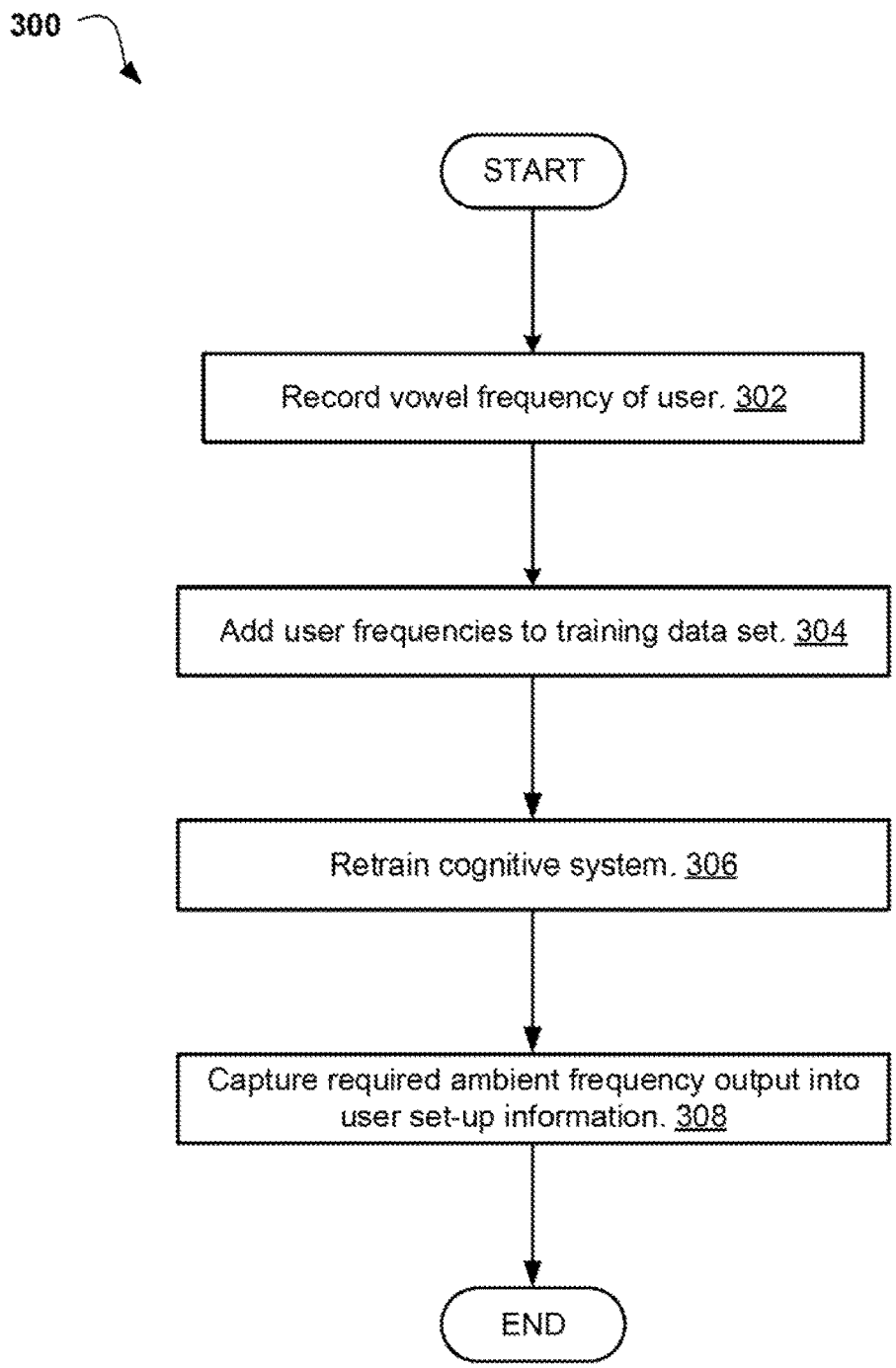
FIG. 3 illustrates an operational flowchart for training a cognitive system in a virtual ambient workstation creation process according to at least one embodiment.

Referring now to FIG. 3, an operational flowchart for training a cognitive system in a virtual ambient workspace creation process 300 is depicted according to at least one embodiment. At 302, the virtual ambient zone creation program 110A, 110B utilizes the facility management system to record the vowel frequencies of the one or more users. When one or more new users register with the facility management system, the one or more new users may be informed that their vowel frequencies will be measured and the vocal-fold frequency classes to which the users belong will be recorded when they speak to enable shaping of the beam patterns. It may be appreciated that the actual sounds and vowel frequencies may not be recorded. For example, if the one or more users state their home address, the words in the address, such as Main Street, may not be recorded. The vowel frequencies may be matched for a, e, i, o, and u. In a typical example, $2^5$ to $2^{10}$ frequency direction combinations may reach the one or more workstations depending on the floorplan of the co-working space.

Then, at 304, the virtual ambient zone creation program 110A, 110B adds the user frequencies of the one or more users to the training data set in the cognitive system. The cognitive system may utilize the API as described above to request from the facility management system the user frequency direction combinations that may reach the one or more workstations. Hence, as more new users register, the training data set may be expanded.

Next, at 306, the virtual ambient zone creation program 110A, 110B retrains the cognitive system. The ML module within the cognitive system may learn of the user frequency direction combinations of the one or more users which may be predominant based on the different one or more users who normally occupy the adjacent one or more workstations as well as the frequency and amplitude of the incoming sound waves. The cognitive system may initially provide different inputs to the acoustic beamers to detect which pattern of beamed sound waves is most effective in molding the frequency and amplitude of the incoming sound waves.

Then, at 308, the virtual ambient zone creation program 110A, 110B captures the required ambient frequency output of the acoustic beamers into the set-up information for the one or more users. The acoustic beamers may produce an output frequency based on the data fed to the cognitive system. In this manner, the sound waves generated by the acoustic beamers may be phase shifted by one-half cycle relative to the incoming sound waves. The output frequency that is determined by the cognitive system to be the most effective in achieving the sufficient level of ambient sound may be saved by the facility management system for future use.

Figure 4:
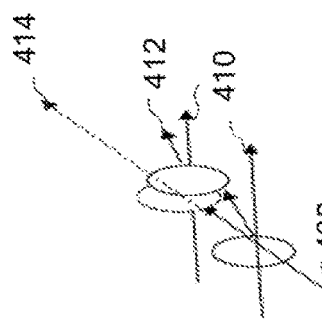
FIG. 4 is a diagram of how an acoustic beam system suppresses sound according to at least one embodiment.
Figure 4:
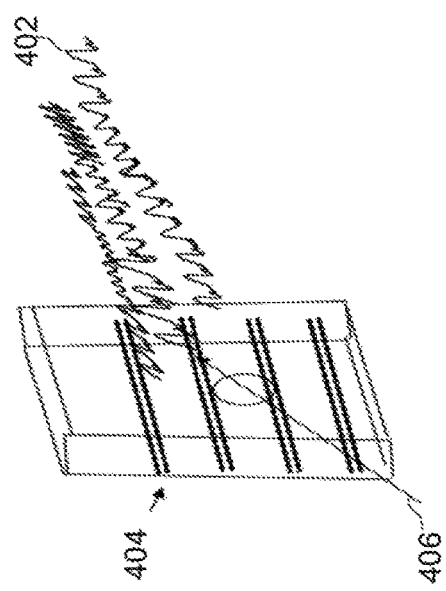

FIG. 4 is a diagram 400 of how suppression of the incoming sound waves 406, 408 is achieved. In response to the virtual ambient zone creation program 110A, 110B determining that the level of ambient sound is not sufficient, the virtual ambient workspace creation process 200 proceeds to step 218 to provide feedback to the cognitive system for learning and adjustment of the beam patterns 410. The required level of ambient sound may be achieved when the two sound waves, i.e., the incoming sound waves 406, 408 and the beamed sound waves 410 emanating from the acoustic beamers 404, in the same or different frequencies are orthogonal and the resulting wave 412 has a smaller amplitude in the resultant direction angled into the virtual ambient zone. Thus, when colliding with additional wavefronts, i.e., the beam patterns 410, the incoming vowel frequency sound 406, 408 may be transformed into the ambient noise remediation sound 402. As shown in FIG. 4, original sound waves 414 of the incoming sound waves 406, 408 may not be angled into the virtual ambient zone.

It may be appreciated that FIGS. 2, 3, and 4 provide only an illustration of one implementation and do not imply any limitations with regard to how different embodiments may be implemented. Many modifications to the depicted environments may be made based on design and implementation requirements.

Figure 5:
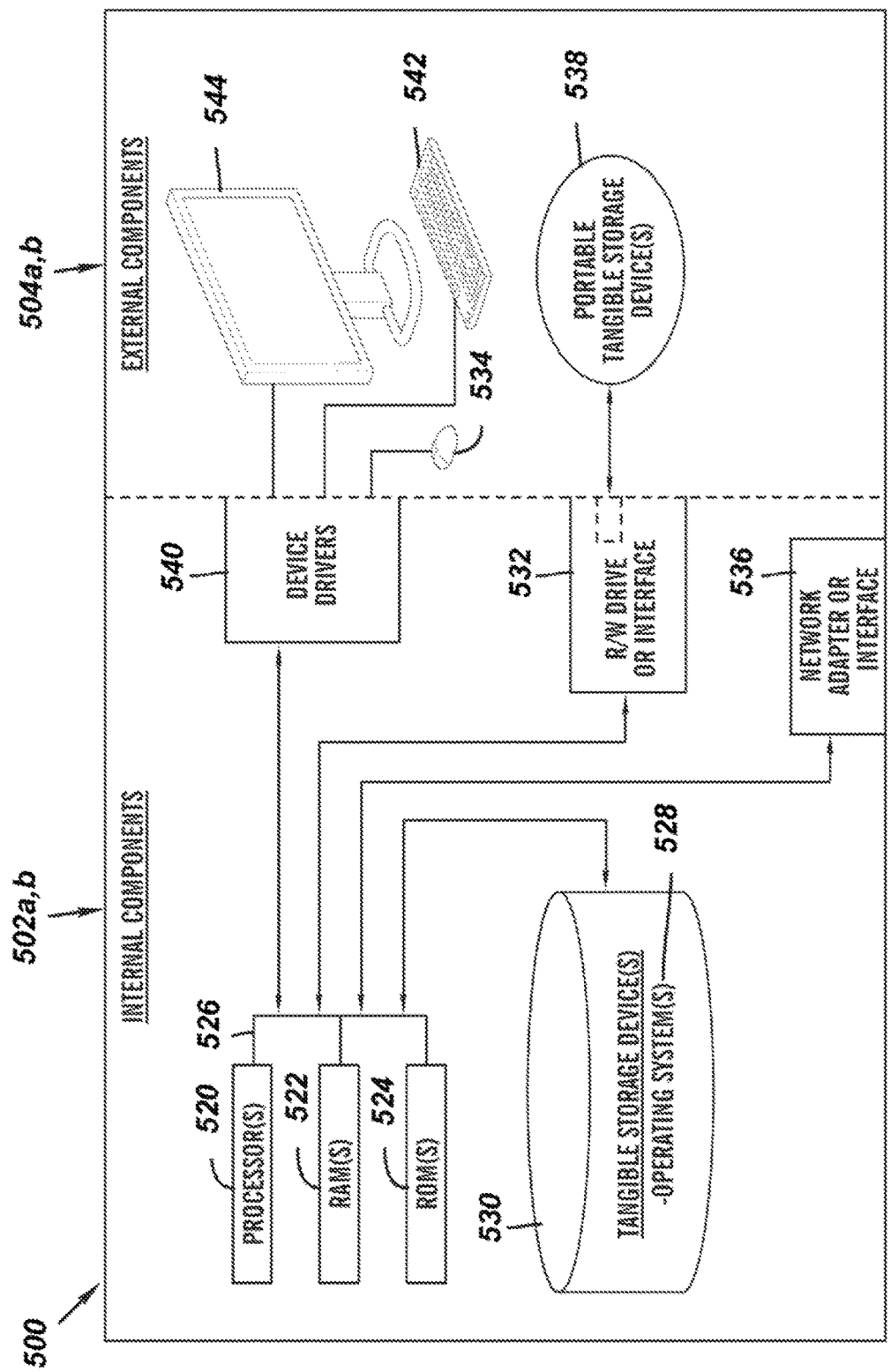
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the virtual ambient zone creation program 110A in the client computing device 102 and the virtual ambient zone creation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the virtual ambient zone creation program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the virtual ambient zone creation program 110A in the client computing device 102 and the virtual ambient zone creation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the virtual ambient zone creation program 110A in the client computing device 102 and the virtual ambient zone creation program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
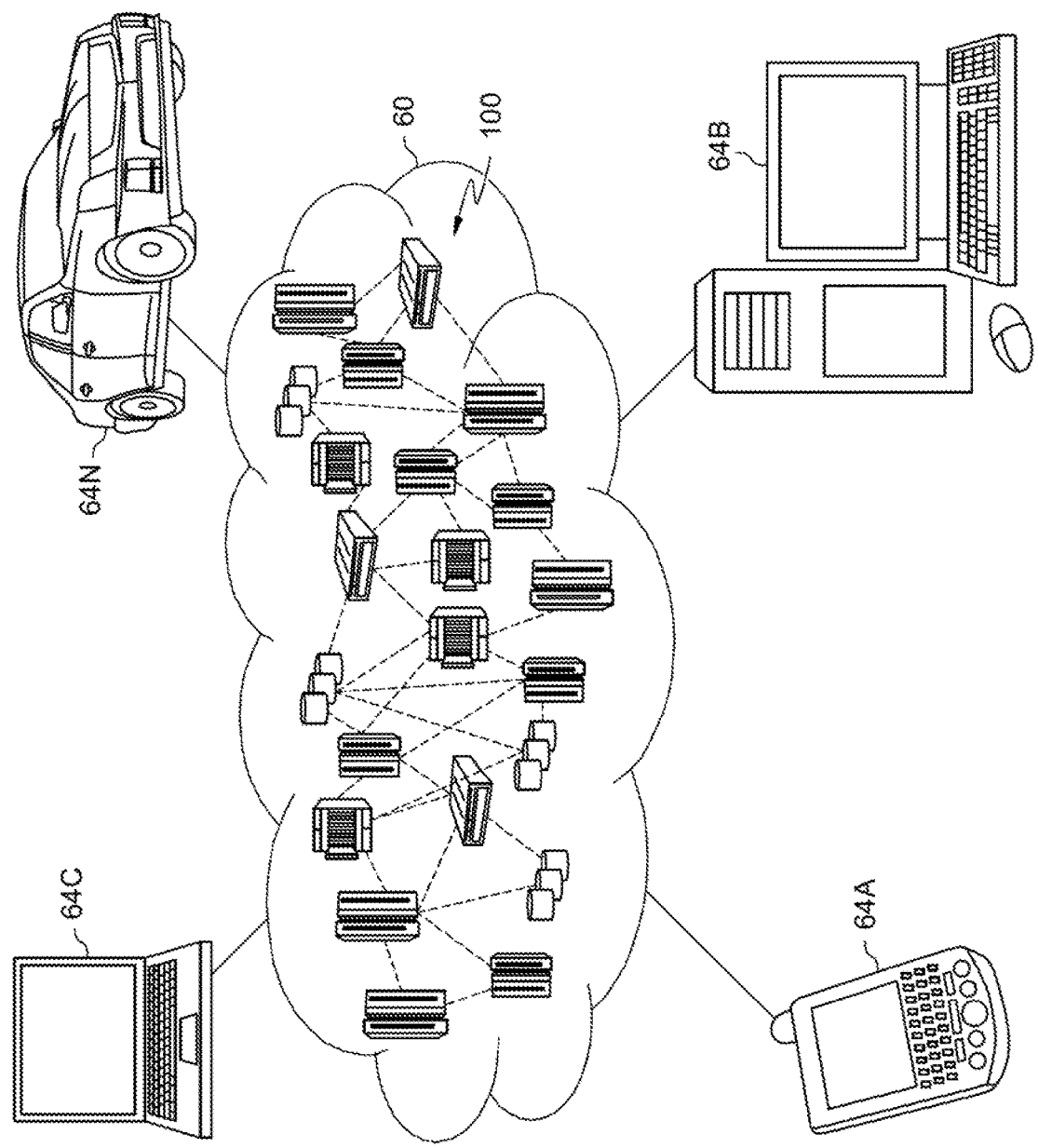
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual ambient zone creation through training data 96. Virtual ambient zone creation through training data 96 may relate to utilizing training data in order to dynamically filter outside noise and, therefore, maximize the user's attention and productivity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of creating a virtual ambient workstation, the method comprising:
   receiving a request to reserve an ambient space for a determined time period;
   identifying one or more workstations that are occupied by one or more other individuals;
   identifying combined vocal-fold sound patterns provided to a cognitive system based on the identified one or more workstations occupied by the one or more other individuals;
   evaluating data obtained from the one or more workstations and the combined vocal-fold sound patterns, wherein the evaluated data enables shaping of beam patterns; and
   generating an ambient noise remediation sound using an acoustic beam system, wherein the ambient noise remediation sound removes high intensity and frequency sounds from the one or more workstations.

2. The method of claim 1, further comprising:
   training the cognitive system with speech and conversations at different volumes.

3. The method of claim 2, further comprising:
   determining whether a level of ambient sound is sufficient; and
   in response to determining the level of ambient sound is not sufficient, providing feedback to the cognitive system through machine learning.

4. The method of claim 3, wherein the provided feedback adjusts the beam patterns created by the acoustic beam system.

5. The method of claim 1, wherein the ambient noise remediation sound is switched off when no acoustic activity is detected in the surroundings.

6. The method of claim 1, wherein the ambient noise remediation sound is configured to be a continuous ambient noise remediation sound.

7. The method of claim 1, wherein the ambient noise remediation sound is configured to be manually switched on or switched off.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a request to reserve an ambient space for a determined time period;
   identifying one or more workstations that are occupied by one or more other individuals;
   identifying combined vocal-fold sound patterns provided to a cognitive system based on the identified one or more workstations occupied by the one or more other individuals;
   evaluating data obtained from the one or more workstations and the combined vocal-fold sound patterns, wherein the evaluated data enables shaping of beam patterns; and
   generating an ambient noise remediation sound using an acoustic beam system, wherein the ambient noise remediation sound removes high intensity and frequency sounds from the one or more workstations.

9. The computer system of claim 8, further comprising:
training the cognitive system with speech and conversations at different volumes.

10. The computer system of claim 9, further comprising:
determining whether a level of ambient sound is sufficient; and
in response to determining the level of ambient sound is not sufficient, providing feedback to the cognitive system through machine learning.

11. The computer system of claim 10, wherein the provided feedback adjusts the beam patterns created by the acoustic beam system.

12. The computer system of claim 8, wherein the ambient noise remediation sound is switched off when no acoustic activity is detected in the surroundings.

13. The computer system of claim 8, wherein the ambient noise remediation sound is configured to be a continuous ambient noise remediation sound.

14. The computer system of claim 8, wherein the ambient noise remediation sound is configured to be manually switched on or switched off.

15. A computer program product, the computer program product comprising:
one or more computer-readable tangible storage medium and program instructions stored on at least one of the one or more tangible storage medium, the program instructions executable by a processor capable of performing a method, the method comprising:
receiving a request to reserve an ambient space for a determined time period;
identifying one or more workstations that are occupied by one or more other individuals;
identifying combined vocal-fold sound patterns provided to a cognitive system based on the identified one or more workstations occupied by the one or more other individuals;
evaluating data obtained from the one or more workstations and the combined vocal-fold sound patterns, wherein the evaluated data enables shaping of beam patterns; and
generating an ambient noise remediation sound using an acoustic beam system, wherein the ambient noise remediation sound removes high intensity and frequency sounds from the one or more workstations.

16. The computer program product of claim 15, further comprising:
training the cognitive system with speech and conversations at different volumes.

17. The computer program product of claim 16, further comprising:
determining whether a level of ambient sound is sufficient; and
in response to determining the level of ambient sound is not sufficient, providing feedback to the cognitive system through machine learning.

18. The computer program product of claim 17, wherein the provided feedback adjusts the beam patterns created by the acoustic beam system.

19. The computer program product of claim 15, wherein the ambient noise remediation sound is switched off when no acoustic activity is detected in the surroundings.

20. The computer program product of claim 15, wherein the ambient noise remediation sound is configured to be a continuous ambient noise remediation sound.

* * * * *